United States Patent
Yen

(10) Patent No.: US 7,915,873 B2
(45) Date of Patent: Mar. 29, 2011

(54) MODE CONTROL CIRCUIT FOR SWITCHING REGULATORS AND METHOD THEREFOR

(75) Inventor: Tami Yen, Santa Clara, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 123 days.

(21) Appl. No.: 12/366,443

(22) Filed: Feb. 5, 2009

(65) Prior Publication Data

US 2010/0194372 A1    Aug. 5, 2010

(51) Int. Cl.
*G05F 3/16* (2006.01)
*G05F 1/00* (2006.01)

(52) U.S. Cl. .................. 323/224; 323/283; 323/284

(58) Field of Classification Search .................. 323/224, 323/283, 284
See application file for complete search history.

(56) References Cited

U.S. PATENT DOCUMENTS 7,436,158 B2 * 10/2008 Huang et al. .................. 323/224

* cited by examiner

*Primary Examiner* — Shawn Riley
(74) *Attorney, Agent, or Firm* — Perkins Coie LLP

(57) ABSTRACT

A mode control method and apparatus for a switching regulator is disclosed. The method receives an input signal and amplifying the input signal to get an amplified signal. The amplified signal is sent to a sample circuit to get a sample signal. The sample signal is delivered to an averaging circuit to get an averaged sensed output signal. The averaged sensed output signal is compared with a first pre-determined threshold or an second pre-determined threshold to get a PWM enable signal. The appropriate mode is determined based on the PWM enable signal.

7 Claims, 2 Drawing Sheets

MODE CONTROL CIRCUIT FOR SWITCHING REGULATORS AND METHOD THEREFOR

TECHNICAL FIELD

The present invention relates to switching regulators, and in particular, to control schemes for switching regulators during high and low load current.

BACKGROUND

When higher efficiency, smaller size, lighter weight, and prolonged battery lifetime are required, switching regulators are used for power management as replacements for linear regulators. The most common control scheme for switching regulators is pulse-width modulation (PWM). The control uses a constant switching frequency but varies the duty cycle as the load current varies. This scheme achieves good regulation, low noise spectrum, and high efficiency at relatively heavy load. However, when the load current is low, PWM mode is inefficient due to the switching loss and the high quiescent current.

There are prior art methods to improve the efficiency of switching regulators at light load. In order to reduce switching loss, the switching frequency can be reduced, cycles can be skipped, or enter into low dropout (LDO) mode at light load. However, those solutions still may not reduce the quiescent current.

SUMMARY

The present invention provides a control scheme for switching regulators which offers smooth transition between two modes of operation automatically depending upon the load condition. These two modes enable the switching regulator to achieve efficient operation through a wide load range.

An exemplary mode control circuit of the present invention comprises: a current sensing amplifier, a sample circuit, an averaging circuit, and a mode control signal generator.

An exemplary mode control method of the present invention comprises: receiving an input signal; amplifying said input signal to get an amplified signal; sending said amplified signal to a sample circuit to get a sample signal; delivering said sample signal to an averaging circuit to get an averaged sensed output signal; comparing said averaged sensed output signal with a first pre-determined threshold or an second pre-determined threshold to get a PWM enable signal; determining mode based on said PWM enable signal.

These and other advantages of the present invention will no doubt become obvious to those of ordinary skill in the art after having read the following detailed description of the preferred embodiments, which are illustrated in the various drawing Figures.

BRIEF DESCRIPTION OF THE DRAWINGS

The foregoing aspects and many of the attendant advantages of the invention will become more readily appreciated and become better understood by reference to the following detailed description, when taken in conjunction with the accompanying drawings, wherein.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
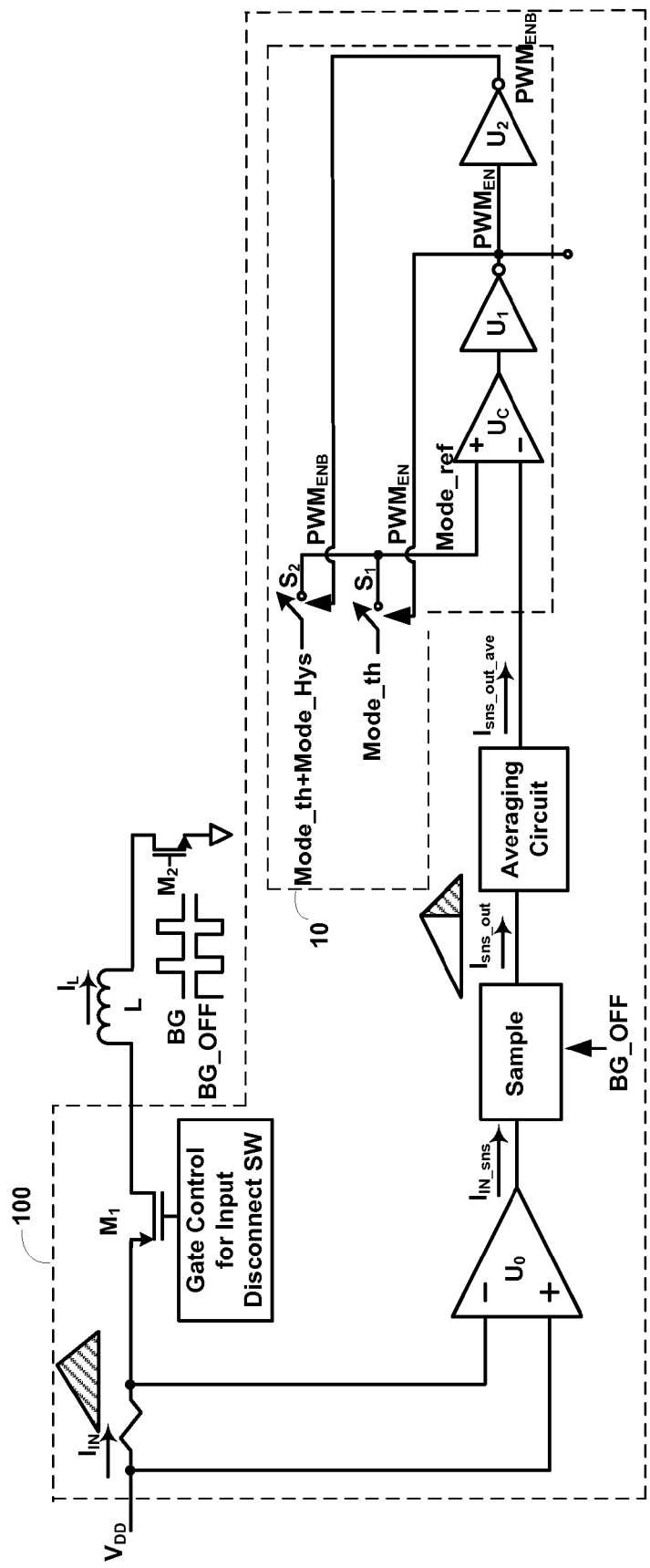
FIG. 1 is a schematic diagram of mode control circuit 100 in accordance with an embodiment of the invention.

Now referring to FIG. 1, a schematic diagram of mode control circuit 100 in accordance with an embodiment of the invention is illustrated. Circuit 100 includes a current sensing amplifier $U_0$ which is electrically coupled to receive an input current $I_{IN}$, and operable to output a current sensing signal $I_{IN\_sns}$. Alternatively, the circuit 100 may also receive an input voltage signal, but for illustration purpose, signals flowing through the circuit 100 are adopted in current signal formats, such as $I_{IN}$, $I_{IN\_sns}$, $I_{sns\_out}$, $I_{out\_sns\_ave}$ which will be illustrated hereinafter, but they may also be in the voltage domain, such as $V_{IN}$, $V_{IN\_sns}$, $V_{sns\_out}$, and $V_{out\_sns\_ave}$. Circuit 100 further includes a sample circuit, an averaging circuit, a mode control signal generator 10, and an input disconnect switch $M_1$. The input disconnect switch $M_1$ is fully on during normal operation when used in non-synchronous application. Switch $M_1$ is periodically on and off in complementary fashion to a low-side switch $M_2$ when used in synchronous application. In one embodiment, mode control signal generator 10 comprises a first switch $S_1$, a second switch $S_2$, a first inverter $U_1$, a second inverter $U_2$, and a comparator $U_C$. Further, there is a low-side switch $M_2$ and an inductor L as shown in FIG. 1, which are part of the main circuit of a switching regulator.

The output terminal of the sense current amplifier $U_0$ is coupled to the input terminal of the sample circuit. The output terminal of the sample circuit is in turn coupled to the input terminal of the averaging circuit. The output of the averaging circuit is coupled to the input terminal of mode control signal generator 10. The output of mode control signal generator 10 acts as the output terminal of circuit 100. In one embodiment, the inverting input terminal of the comparator $U_C$ acts as the input terminal of mode control signal generator 10. The output of the comparator $U_C$ is coupled to the input of the first inverter $U_1$. The output of the first inverter $U_1$ is then coupled to the input terminal of the second inverter $U_2$. The output of the first inverter $U_1$ also acts as the output terminal of mode control signal generator 10.

One terminal of the first switch $S_1$ receives a signal Mode_th which is a first pre-determined threshold, while one terminal of the second switch $S_2$ receives a signal Mode_th+Mode_Hys which is a second pre-determined threshold. The other terminal of the first switch $S_1$ and the other terminal of the second switch $S_2$ are coupled together to the non-inverting input terminal of the comparator $U_C$. The first switch $S_1$ is controlled by a signal $PWM_{EN}$ which is output from the first inverter $U_1$, while the second switch $S_2$ is controlled by a signal $PWM_{ENB}$ which is output from the second inverter $U_2$.

The polarity of inputs of the comparator $U_C$ is not limited to the connection illustrated herein, but they can be swapped by proper adjustment of the polarity of controls for switch $S_1$, $S_2$, and thresholds.

The low-side switch $M_2$ in the main circuit is controlled by a signal BG, while the sample circuit is controlled by a signal BG_OFF, wherein the signal BG and the signal BG_OFF are complimentarily-phased. When the low-side switch $M_2$ is turned on, the sample circuit is disabled; when the low-side switch $M_2$ is turned off, the sample circuit is active and it will sample the sensed input current during $M_2$'s OFF cycle.

When the signal BG_OFF is high, the low-side switch $M_2$ is turned off, the sample circuit is available. The input current $I_{IN}$ is sensed and amplified by the current sensing amplifier $U_0$. The output of the current sensing amplifier $U_0$ is $I_{IN\_sns}=A*I_{IN}$, wherein A is the gain of the current sensing amplifier $U_0$. The signal $I_{IN\_sns}$ is sent to the sample circuit since the sample circuit is available now. The output of the sample circuit $I_{sns\_out}$ is the sampled signal of $I_{IN\_sns}$, shown as the shadow area of the drawing in FIG. 1, thus it is proportional to the load current $I_{LOAD}$. The signal $I_{sns\_out}$ which represents the load current $I_{LOAD}$ is then sent to the averaging circuit to get an averaged sensed output current $I_{out\_sns\_ave}$ which is input to the inverting input terminal of the comparator $U_C$.

When the output of the comparator $U_C$ is low, the signal $PWM_{EN}$ is high, and the $PWM_{ENB}$ is low. Thereupon, the first switch $S_1$ is turned on, the second switch $S_2$ is turned off. As a result, the first pre-determined threshold Mode_th is directly sent to the non-inverting input terminal of the comparator $U_C$. When the output of the comparator $U_C$ is high, the signal $PWM_{EN}$ is low, the $PWM_{ENB}$ is high. Thereupon, the first switch $S_1$ is turned off, the second switch $S_2$ is turned on. As a result, the second pre-determined threshold Mode_th+Mode_Hys is directly sent to the non-inverting input terminal of the comparator $U_C$. The comparator $U_C$ compares the sensed output current $I_{out\_sns\_ave}$ with the first pre-determined threshold Mode_th or with the second pre-determined threshold Mode_th+Mode_Hys. If the sensed output current $I_{out\_sns\_ave}$ is lower than the first pre-determined threshold Mode_th, the comparator $U_C$ will output a high signal, causing the signal $PWM_{EN}$ to be low and the signal $PWM_{ENB}$ to be high accordingly. Thereupon, the system will transition into constant-peak-current PFM mode.

In contrast, if the sensed output current $I_{out\_sns\_ave}$ is higher than the second pre-determined threshold Mode_th+Mode_Hys, the comparator $U_C$ will output a low signal, causing the signal $PWM_{EN}$ to be high and the signal $PWM_{ENB}$ to be low accordingly. Thereupon, the system will transition into PWM mode. That is, when the averaged sensed output current is lower than the first pre-determined threshold Mode_th, the switching regulator is in light load condition. When the averaged sensed output current is higher than the second pre-determined threshold Mode_th+Mode_Hys, the switching regulator is in heavy load condition. It can be seen that the signal $PWM_{EN}$ is the PWM enable signal, the signal $PWM_{ENB}$ is the complementary-phase signal of the PWM enable signal $PWM_{EN}$. When the PWM enable signal $PWM_{EN}$ is low, the switching regulator enters constant-peak-current PFM mode; when the PWM enable signal $PWM_{ENB}$ is high, the switching regulator enters PWM mode.

Figure 2:
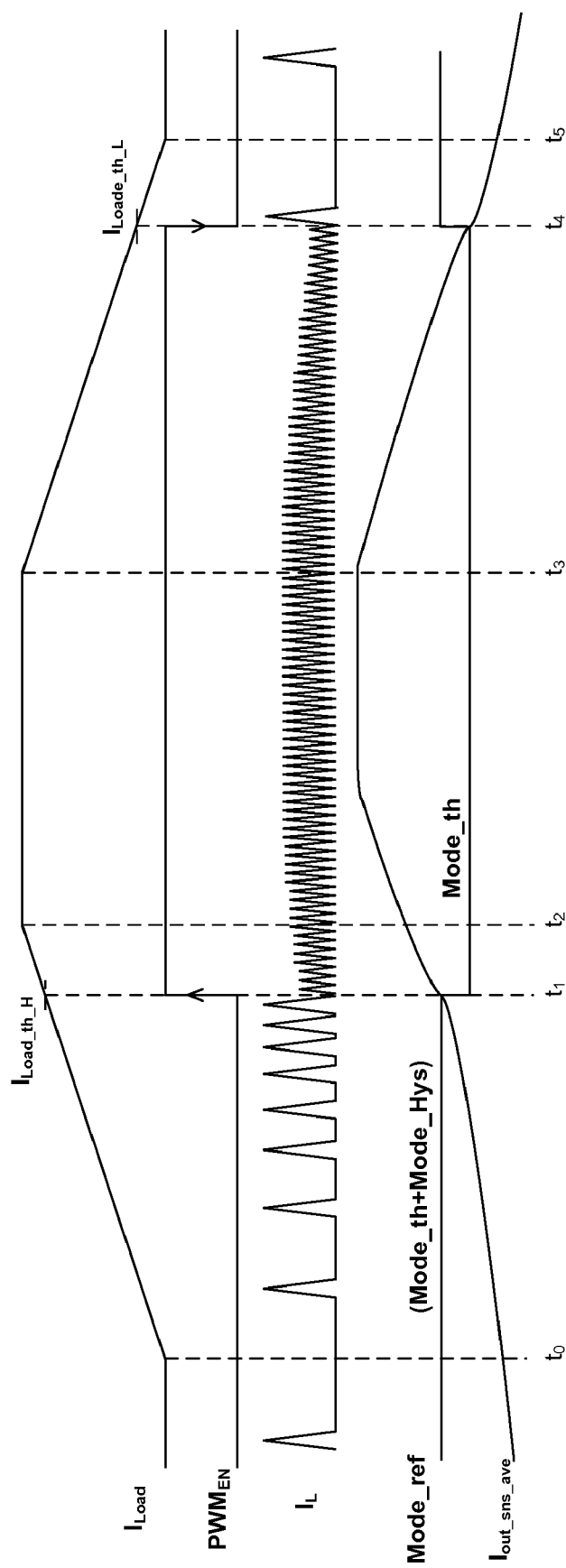
FIG. 2 depicts waveforms of different signals in circuit 100 shown in FIG. 1.

Referring to FIG. 2, waveforms of different signals in circuit 100 shown in FIG. 1 is depicted. As shown in FIG. 2, before time $t_1$, the load current $I_{LOAD}$ is low, the inductor current $I_L$ is discontinuous. The sensed output current $I_{out\_sns\_ave}$ is lower than the first pre-determined threshold Mode_th, the output of the comparator $U_C$ is high. Thus the signal $PWM_{EN}$ is low, and the signal $PWM_{ENB}$ is high accordingly. The low signal $PWM_{EN}$ turns off the first switch $S_1$, while the high signal $PWM_{ENB}$ turns on the second switch $S_2$. Thereupon, the second pre-determined threshold Mode_th+Mode_Hys is directly sent to the non-inverting input terminal of the comparator $U_C$, and the system is on constant-peak-current PFM mode. When the load current begins to increase at time $t_0$, the time between each switching cycle gets shorter and pulses of inductor current $I_L$ are getting closer. The sensed output current $I_{out\_sns\_ave}$ is increased proportionally. When at time t1, the sensed output current $I_{out\_sns\_ave}$ is higher than the second pre-determined threshold Mode_th+Mode_Hys, the comparator $U_C$ outputs a low signal, causing the signal $PWM_{EN}$ to be high and the signal $PWM_{ENB}$ to be low accordingly. The system transitions into PWM mode. From time $t_2$, the system stays in the heavy load condition. The operation of switching regulators in heavy load condition is known to those skilled in the art, which will not be illustrated herein.

Continuing to refer to FIG. 2, at time $t_3$, the load condition changes again, the load current $I_L$ begins to be decreased, the sensed output current $I_{out\_sns\_ave}$ is decreased accordingly. When at time $t_4$, the sensed output current $I_{out\_sns\_ave}$ is lower than the first pre-determined threshold Mode_th, the comparator $U_C$ outputs a high signal, causing the signal $PWM_{EN}$ to be low and the signal $PWM_{ENB}$ to be high accordingly. Thus, the first pre-determined threshold Mode_th is directly sent to the non-inverting input terminal of the comparator $U_C$, and the system transitions into constant-peak-current PFM mode. The inductor current $I_L$ becomes discontinuous. From time $t_5$, the system stays in the light load condition. The operation of switching regulators in light load condition is known to those skilled in the art, which will not be illustrated herein.

FIG. 2 illustrates that the mode transition is very smooth and well defined.

The present invention further provides a mode control method for switching regulators. The method comprises: receiving an input signal; amplifying said input signal to get an amplified signal; sending said amplified signal to a sample circuit to get a sample signal; delivering said sample signal to an averaging circuit to get an averaged sensed output current; comparing said averaged sensed output current with a first pre-determined threshold or an second pre-determined threshold to get a PWM enable signal; and determining mode based on said PWM enable signal.

The first pre-determined threshold indicates the switching regulator is in light load condition. The second pre-determined threshold indicates said switching regulator is in heavy load condition. When the averaged sensed output current is lower than said first pre-determined threshold, the PWM enable signal is low, the switching regulator enters constant-peak-current PFM mode accordingly. When the averaged sensed output current is higher than the second pre-determined threshold, the PWM enable signal is high, the switching regulator enters PWM mode accordingly. When the low-side switch in the main circuit is turned on, the sample circuit is disabled. When the low-side switch in the main circuit is turned off, the sample circuit is active. When the averaged sensed output current is higher than the first pre-determined threshold, the switching regulator is in light load condition. When the averaged sensed output current is higher than the second pre-determined threshold, the switching regulator is in heavy load condition.

As described above, circuit 100 realizes good efficiency in both heavy load condition and light load condition. The switching regulator switches between constant-peak-current PFM mode at light load and PWM mode at heavy load. The PFM mode has lower switching frequency which reduces the switching loss, and lower quiescent current consumption resulting in the better standby efficiency. The PWM mode has high efficiency and good regulation at heavy load. Therefore, coupled with the invention, it offers high efficiency through the entire load range and provides the smooth transition automatically between the modes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A mode control method used for a switching regulator, comprising:
   receiving an input signal;
   amplifying said input signal to get an amplified signal;
   sampling said amplified signal to get a sampled signal;
   averaging said sampled signal to get an averaged sensed output signal;
   comparing said averaged sensed output signal with a first pre-determined threshold or a second pre-determined threshold, wherein the comparing generates a PWM enable signal which is used to determine the mode, and when said averaged sensed output signal is lower than said first pre-determined threshold, said PWM enable signal is low, and when said averaged sensed output signal is higher than said second pre-determined threshold, said PWM enable signal is high, further wherein when said PWM enable signal is low, said switching regulator enters constant-peak-current PFM mode; when said PWM enable signal is high, said switching regulator enters PWM mode.

2. The mode control method of claim 1, wherein:
   when a low-side switch of said switching regulator is turned on, said sampling is disabled; when the low-side switch of said switching regulator is turned off, said sampling is active.

3. A system comprising:
   a switching regulator; and
   a mode control circuit coupled to said switching regulator to generate a mode control signal to said switching regulator which determines mode control of said system, said mode control circuit comprising,
   a current sensing amplifier electrically coupled to receive an input signal and operable to provide a current amplified signal;
   a sample circuit electrically coupled to said current sensing amplifier operable to provide a sampled signal;
   an averaging circuit electrically coupled to said sample circuit operable to provide an averaged sensed signal;
   a mode control signal generator electrically coupled to said averaging circuit operable to provide said mode control signal, wherein
   said mode control signal generator comprises a comparator, a first switch, a second switch, a first inverter, and a second inverter;
   wherein the inverting input terminal of said comparator acts as the input terminal of said mode control signal generator, which is coupled to said averaging circuit to receive said averaged sensed signal; one terminal of said first switch is electrically coupled to receive a first pre-determined threshold, the other terminal of said first switch is coupled to the non-inverting input terminal of said comparator; one terminal of said second switch is electrically coupled to receive a second pre-determined threshold, the other terminal of said second switch is also coupled to the non-inverting input terminal of said comparator; said comparator compares said averaging signal with said first pre-determined threshold or said second pre-determined threshold, to provide a compared signal;
   said first inverter is electrically coupled to said comparator, operable to provide an inverted compared signal which is a PWM enable signal;
   said second inverter is electrically coupled to said first inverter, operable to provide a further inverted compared signal which is a reversed signal of said PWM enable signal; the output terminal of said first inverter acts as the output terminal of said mode control circuit.

4. The system of claim 3, wherein
   when the low-side switch in the main circuit of said switching regulator is turned on, said sample circuit is disabled; when the low-side switch in the main circuit of said switching regulator is turned off, said sample circuit is active.

5. The system of claim 3, wherein when said averaged signal is lower than said first pre-determined threshold, said PWM enable signal is low; when said averaged sensed output current is higher than said second pre-determined threshold, said PWM enable signal is high.

6. The system of claim 3, wherein said first switch is controlled by said PWM enable signal, while said second switch is controlled by said reversed signal of said PWM enable signal.

7. The system of claim 6, wherein when said PWM enable signal is low, said switching regulator enters constant-peak-current PFM mode; when said PWM enable signal is high, said switching regulator enters PWM mode.

* * * * *